Feb. 3, 1925.
W. J. NEW, JR
1,524,746
LAP LINK
Filed May 6, 1924
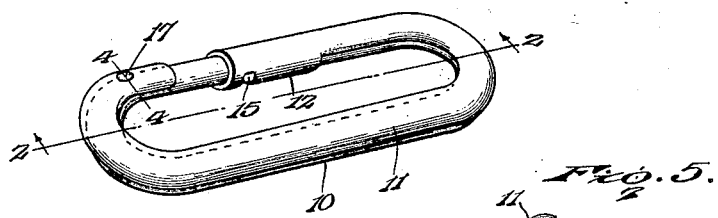
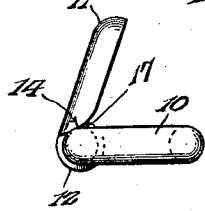
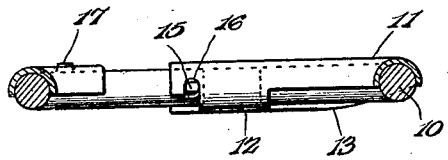
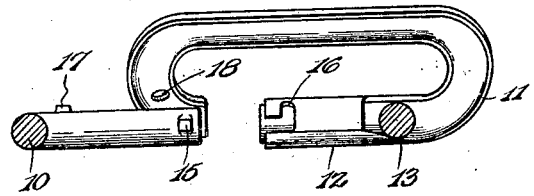
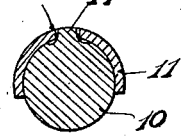
Inventor
W. J. New, Jr.
By
Lacey Lacey, Attorneys Patented Feb. 3, 1925.

1,524,746

UNITED STATES PATENT OFFICE.

WILLIAM JASPER NEW, JR., OF FRANKFORT, KENTUCKY.

LAP LINK.

Application filed May 6, 1924. Serial No. 711,470.

*To all whom it may concern:*

Be it known that I, WILLIAM JASPER NEW, Jr., a citizen of the United States, residing at Frankfort, in the county of Franklin and State of Kentucky, have invented certain new and useful Improvements in Lap Links, of which the following is a specification.

This invention relates to an improved lap link and seeks, among other objects, to provide a link which may readily be manually opened or closed and which will thus provide a convenient device for connecting the ends of chains, for farm usage, or for various other purposes where such a link would prove advantageous.

The invention seeks, as a further object, to provide a link which when closed will not accidentally become open.

And the invention seeks, as a still further object, to provide a link which be strong and durable and which will be so formed as not to prove cumbersome or unhandy.

Other and incidental objects will appear hereinafter.

In the drawings:

Figure 1 is a perspective view of my improved link,

Figure 2 is a sectional view on the line 2—2 of Figure 1, looking in the direction of the arrows, and particularly showing the relation of the link sections when the link is closed, Figure 3 is a view similar to Figure 2, showing the relation of the link sections when the link is open, Figure 4 is a detail sectional view on the line 4—4 of Figure 1, and Figure 5 is an end view showing the link open.

In carrying the invention into effect, I employ a pair of mating looped link sections 10 and 11 respectively. These link sections are identical in general contour. However, the link section 10 is preferably cylindrical in cross section while the section 11 is a trough-shaped to fit over the section 10. At corresponding points, the link sections are provided with openings of substantially equal length and formed on one end of the section 11 is a coupling sleeve 12 fitting one end of the section 10 for pivotally and slidably connecting the section 11 with the section 10. As best brought out in Figure 3 of the drawings, the section 11 is preferably formed of suitable sheet metal stamped at one end thereof with wings which are bent toward each other to produce the sleeve and, as will be observed, the outermost of said wings is formed with a tapered rear end portion 13 merging gradually into the curved outer side of said section. At its free end, the section 11 is, as shown in Figure 5, provided with a beveled or inclined outer edge 14.

Formed from the material of the link section 10 near the end thereof opposite that end mounting the sleeve 12 or, in other words, the free end of said section, is an upstanding stud 15 and formed in the outer end of the sleeve to accommodate said stud is an L-shaped slot 16. The end of the section 10 carrying the stud 15 is, as shown in detail in Figure 4, similarly formed with an upstanding stud 17, it being observed in this connection, that the stud 15 is at the inner side of the section 10 while the stud 17 is at the upper side thereof. Formed in the link section 11 near its free end is an opening 18 to accommodate the stud 17.

As will now be seen, by swinging the section 11 upon the section 10 to the position shown in Figure 3, the sleeve 12 may be shifted endwise along the adjacent end of the section 10 until the openings in the link sections are brought into registration. The links of a chain or the like may then, of course, be readily engaged with the device. Closing of the link is effected by first shifting the link section 11 upon the section 10 until the sleeve 12 of the former section spans the opening in the later section when, of course, the section 10 will likewise span the opening in the section 11. As the shifting of the link section 11 is continued, the stud 15 is received in the bottom portion of the slot 16 when the section 11 is, as shown in Figures 1 and 2, swung down to fit over the section 10. When the section 11 is thus swung down, the stud 17 of the section 10 will be projected through the opening 18 of the section 11 so that the stud will not only serve to brace the adjacent end portion of the section 11 but will also lock the sections against relative endwise movement. Like functions will, of course, be performed by the stud 15. Accordingly, as will be seen, accidental opening of the link will not only be prevented but also, a strong and rigid structure is provided.

While the studs 15 and 17 serve to lock the sections of the link against accidental opening still, said studs are, nevertheless, primarily provided to strengthen and reinforce the link against endwise pull. For certain purposes it may be found desirable to produce the link without the studs and, in this connection, attention is directed to the fact that, independently of the locking function of the studs, the link is so constructed that the link sections will be locked against opening movement. As shown in Figure 2, the bight portions of the link section 11 will, when the link is closed, coact with the bight portions of the section 10 for locking the sections against relative endwise movement while, when the link section 11 is swung up to the approximate position shown in Figure 3, the portion 13 of the sleeve 12 will abut the lower side of the section 10 for limiting the section 11 in its upward movement. The portion 13 of the sleeve 12 is so formed that the section 11 will be limited in an up position such that when the section 11 is then shifted upon the section 10 in a direction for opening the link, the end edge 14 of the section 11 will as shown in Figure 5 be caused to travel or ride upwardly over the free end of the section 10 to the upper side thereof. Thus, the free end portion of the section 11 will be flexed with the result that the edge 14 of said section will be caused to frictionally bear against the upper side of the free end of the section 10 resisting relative endwise movement of the sections. Furthermore, as the endwise movement of the section 11 is continued, the inclined edge of the portion 13 will coact with the lower side of the section 10 for rotating the sleeve 12 in a direction tending to swing the link section 11 downwardly quite a bit from its original uppermost position, with the result that a torsional strain will be brought to bear on the section 11 pressing the edge 14 of said section against the free end of the section 10 with considerable force. Accordingly, the free end of the section 11 will be caused to impinge the free end of the section 10 so that the sections will not only be locked against relative endwise movement when closed but will also effectually coact for resisting such movement when swung apart. Accidental opening of the link when constructed without the studs 15 and 17 will thus be prevented.

Having thus described the invention, what I claim is:

1. A link including mating link sections each provided at a point in its length with an opening and one provided with means to coact with the other slidably connecting the sections for endwise movement to dispose said openings in registration or to dispose the sections in registration each closing the opening in the other, said means also swingingly connecting the sections for movement to superimposed relation.

2. A link including mating link sections each provided at a point in its length with an opening and one provided with means to coact with the other slidably connecting the sections for movement to dispose said openings in registration or to dispose the sections in registration each closing the opening in the other, said means also swingingly connecting the sections for movement to superimposed relation, and means locking the sections against relative sliding movement when superimposed.

3. A link including mating link sections each provided at a point in its length with an opening and one provided with means to coact with the other slidably connecting the sections for movement to dispose said openings in registration or to dispose the sections in registration each closing the opening in the other, said means also swingingly connecting the sections for movement to superimposed relation, and a stud carried by one section to coact with the other section for locking the sections against relative sliding movement when superimposed.

4. A link including mating link sections each provided at a point in its length with an opening and one provided with a sleeve to freely receive the other slidably connecting the sections for movement to dispose said openings in registration or to dispose the sections in registration each closing the opening in the other, said sleeve being provided with a slot and also swingingly connecting the sections for movement to superimposed relation, and a stud projecting from the other section to be received in said slot for locking the sections against relative sliding movement when superimposed.

5. A link including mating link sections each provided at a point in its length with an opening and one being formed from sheet metal and having wings bent to produce a sleeve to freely receive the other of said sections slidably connecting the sections for movement to dispose said openings in registration or to dispose the sections in registrations each closing the opening in the other, the sleeve also swingingly connecting the sections for movement to superimposed relation, and spaced studs carried by one end of the latter section to engage both ends of the former section for locking the sections against relative sliding movement when superimposed.

6. A link including mating link sections each provided at a point in its length with an opening and one of said sections being provided with a sleeve freely receiving the other of said sections slidably connecting the sections for movement to dispose said openings in registration or to dispose the sections in registration each closing the opening in the other, said sleeve also swingingly connecting the sections for movement to superimposed relation and one of the sections being shaped to embrace the other of said sections locking the sections against relative sliding movement when superimposed.

7. A link including mating link sections each provided at a point in its length with an opening and one of said sections being provided with a sleeve freely receiving the other of said sections slidably connecting the sections for movement to dispose said openings in registration or to dispose the sections in registration each closing the opening in the other, said sleeve also swingingly connecting the sections for movement to superimposed relation or apart in angular relation and one of the sections being provided with means to coact with the other of said sections for limiting the sections when swung apart whereby the free end of the former section will be caused to frictionally coact with said latter section for resisting relative sliding movement of the sections.

8. A link including a link section provided at a point in its length with an opening, a mating link section provided at a point in its length with an opening and near one end thereof with a sleeve freely receiving one end of said first mentioned section slidably connecting the sections for movement to dispose said openings in registration or to dispose the sections in registration each closing the opening in the other, the sleeve also swingingly connecting the sections for movement to angular relation or movement to superimposed relation and said last mentioned section being shaped to embrace said first mentioned section for locking the sections against relative sliding movement when superimposed and having the sleeve thereof formed with a portion to coact with said first mentioned section for limiting the sections in angular relation whereby when the sections are slidably shifted, the free end of the latter section will be caused to flex and ride up over the free end of the former section while said portion of the sleeve will tend to counter-rotate the sleeve and cause torsional strain on the latter section tending to press the free end of the latter section against the free end of the former section for resisting sliding movement of the sections.

In testimony whereof I affix my signature.

WILLIAM JASPER NEW, Jr. [L. S.]